(12) United States Patent
Ding et al.

(10) Patent No.: US 10,084,545 B2
(45) Date of Patent: *Sep. 25, 2018

(54) DISTRIBUTED TRAVELING-WAVE MACH-ZEHNDER MODULATOR DRIVER

(71) Applicant: Elenion Technologies, LLC, New York, NY (US)

(72) Inventors: Ran Ding, New York, NY (US); Thomas Wetteland Baehr-Jones, Arcadia, CA (US); Michael J. Hochberg, New York, NY (US); Alexander Rylyakov, Staten Island, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,351

(22) Filed: Dec. 4, 2017

(65) Prior Publication Data

US 2018/0083710 A1    Mar. 22, 2018

Related U.S. Application Data

(63) Continuation of application No. 15/234,359, filed on Aug. 11, 2016, now Pat. No. 9,853,738, which is a (Continued)

(51) Int. Cl.
*H04B 10/04* (2006.01)
*H04B 10/556* (2013.01)
(Continued)

(52) U.S. Cl.
CPC ....... *H04B 10/5561* (2013.01); *G02F 1/0123* (2013.01); *G02F 1/025* (2013.01); (Continued)

(58) Field of Classification Search
CPC .............. H04B 10/505; H04B 10/548; H04B 10/5561; H04B 10/556; H04B 10/516; (Continued)

(56) References Cited

U.S. PATENT DOCUMENTS 7,039,258 B2   5/2006  Gunn, III
7,382,943 B1   6/2008  Heaton
(Continued)

OTHER PUBLICATIONS

Knochenauer, C. et al., "A Compact, Low-Power 40-GBit/s Modulator Driver With 6-V Differential Output Swing in 0.25um SiGe BiCMOS," Solid-State Circuits, IEEE Journal of, vol. 46, No. 5, pp. 1137-1146, 2011.
(Continued)

*Primary Examiner* — Hahn Phan
(74) *Attorney, Agent, or Firm* — Nixon Peabody LLP

(57) ABSTRACT

A distributed traveling-wave Mach-Zehnder modulator driver having a plurality of modulation stages that operate cooperatively (in-phase) to provide a signal suitable for use in a 100 Gb/s optical fiber transmitter at power levels that are compatible with conventional semiconductor devices and conventional semiconductor processing is described.

15 Claims, 6 Drawing Sheets

Related U.S. Application Data continuation-in-part of application No. 14/618,989, filed on Feb. 10, 2015, now Pat. No. 9,559,779.

(60) Provisional application No. 61/937,683, filed on Feb. 10, 2014.

(51) Int. Cl.
| | |
|---|---|
| *G02F 1/025* | (2006.01) |
| *G02F 1/01* | (2006.01) |
| *G02F 1/225* | (2006.01) |
| *H04B 10/54* | (2013.01) |
| *H04B 10/516* | (2013.01) |
| *G02F 1/21* | (2006.01) |

(52) U.S. Cl.
CPC ....... *G02F 1/2257* (2013.01); *H04B 10/5161* (2013.01); *H04B 10/541* (2013.01); *G02F 2001/212* (2013.01); *G02F 2201/127* (2013.01)

(58) Field of Classification Search
CPC ............ H04B 10/5161; H04B 10/5055; H04B 10/5053; G02F 1/011; G02F 1/225
USPC ....... 398/183, 188, 192, 193, 194, 195, 196, 398/197, 198, 158, 159, 162, 135, 136; 359/245, 248, 237, 238, 279; 385/1, 2, 3, 385/14
See application file for complete search history.

(56) References Cited

U.S. PATENT DOCUMENTS

| | | | |
|---|---|---|---|
| 7,515,775 | B1 | 4/2009 | Kucharski |
| 9,559,779 | B2 * | 1/2017 | Ding ............... H04B 10/505 |
| 9,853,738 | B2 * | 12/2017 | Ding ............... H04B 10/5561 |
| 2005/0036791 | A1 | 2/2005 | Gunn, III |
| 2007/0047969 | A1 | 3/2007 | Nakashima |
| 2007/0280576 | A1 | 12/2007 | Kucharski |
| 2008/0112710 | A1 | 5/2008 | Tanaka |
| 2009/0148094 | A1 | 6/2009 | Kucharski |
| 2009/0245813 | A1 * | 10/2009 | Bonthron ............ G02F 1/0327 398/188 |
| 2011/0044702 | A1 | 2/2011 | Mizuguchi |
| 2011/0135242 | A1 | 6/2011 | Prosyk |
| 2013/0209023 | A1 | 8/2013 | Prosyk |
| 2015/0331262 | A1 | 11/2015 | Noguchi |

OTHER PUBLICATIONS

Ding, Ran at al., "Design and Characterization of a 30-GHz Bandwidth Low-Power Silicon Traveling-Wave Modulator," Optics Communications, available online Feb. 7, 2014.

International Search Report, PCT/US2015/15210, dated Dec. 7, 2015 (2 pages).

Written Opinion of the International Searching Authority, PCT/US2015/15210, dated Dec. 7, 2015 (4 pages).

* cited by examiner

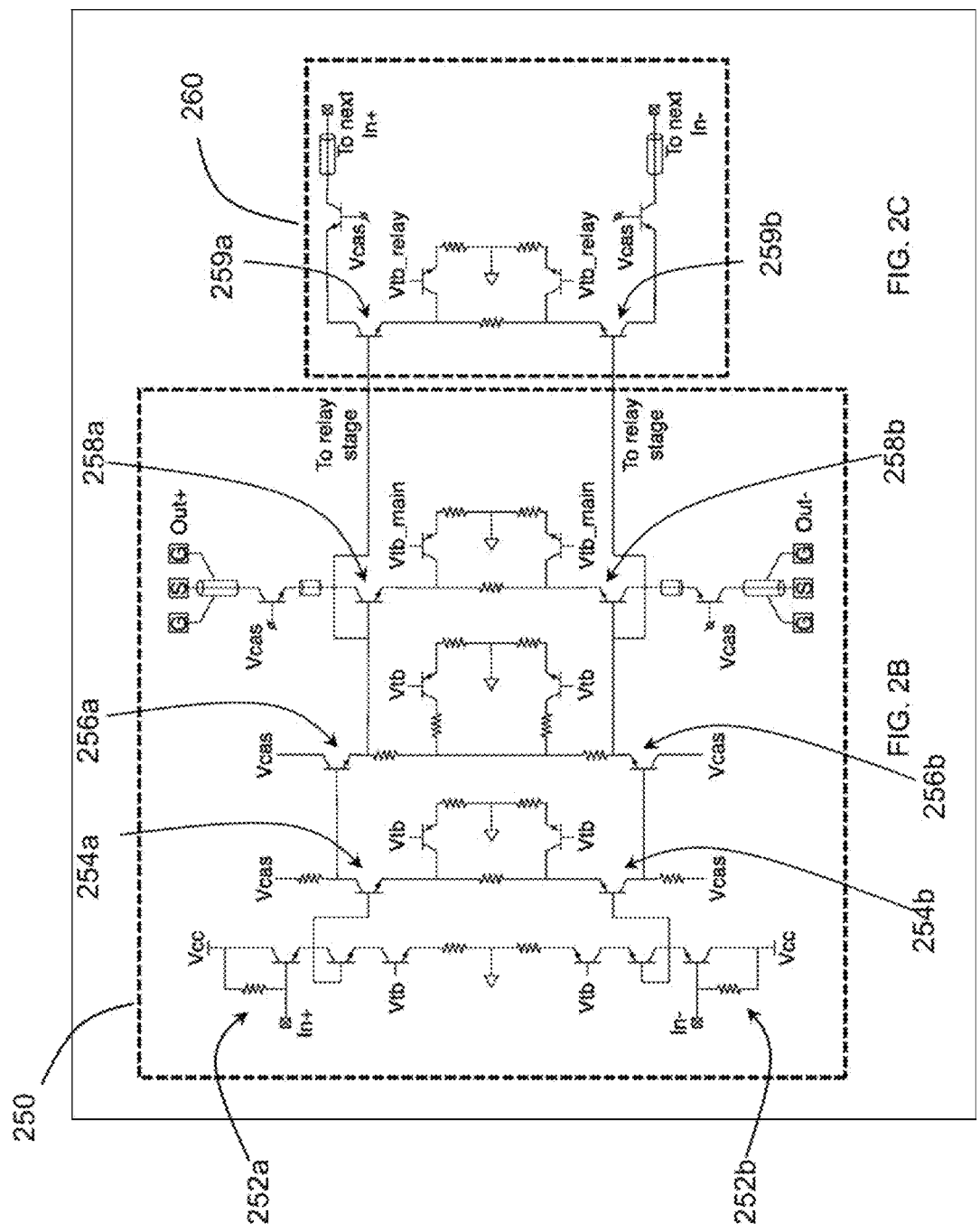

DISTRIBUTED TRAVELING-WAVE MACH-ZEHNDER MODULATOR DRIVER

CROSS-REFERENCE TO RELATED APPLICATIONS

This application is a continuation of U.S. patent application Ser. No. 15/234,359, filed Aug. 11, 2016, now allowed, which is a continuation-in-part of and claims priority to and the benefit of U.S. patent application Ser. No. 14/618,989, now U.S. Pat. No. 9,559,779 filed Feb. 10, 2015, which claims priority to U.S. Provisional Application No. 61/937,683, filed Feb. 10, 2014, each of which is hereby incorporated by reference herein in its entirety.

FIELD OF THE INVENTION

The invention relates to optical transmitters in general, and particularly to an optical driver for a Gigabit/second transmitter.

BACKGROUND OF THE INVENTION

Optical interconnects offer promising solutions to data transmission bottlenecks in supercomputers and in datacenters as well as other applications. Adopting higher channel data rates can greatly reduce the complexity in optical communication systems and/or further improve interconnect capacity and density.

The most important requirement on the driver amplifier is the output voltage swing. The state-of-the-art driver amplifier in CMOS/BiCMOS can output 3 Vpp at 40 Gb/s, consuming 1.35 W DC power. See for example, C. Knochenhauer, J. Scheytt, and F. Ellinger, "A Compact, Low-Power 40-GBit/s Modulator Driver With 6-V Differential Output Swing in 0.25 um SiGe BiCMOS," Solid-State Circuits, IEEE Journal of, vol. 46, no. 5, pp. 1137-1146, 2011.

At higher data rates it is difficult to maintain or improve the available drive voltage without substantial advances in the fabrication process. This trend is at odds with the increasingly higher drive voltage required by modulators at higher speed.

There is a need for improved drivers for use in optical data handling systems.

SUMMARY OF THE INVENTION

Accordingly, the present disclosure relates to a distributed traveling wave modulator, comprising: a differential optical input for receiving an optical input carrier signal and a differential optical output for providing a modulated optical carrier signal; a plurality of optical phase-shifters connected in series as sequential modulators between said differential optical input and said differential optical output; a plurality of driver amplifier stages, each including a respective differential driver amplifier input, a differential driver amplifier output, and a differential signal output connected to a respective one of said sequential modulators; a plurality of delay/relay stages, each including a respective differential delay/relay input and a differential delay/relay output, each of said delay/relay stages connected between two driver amplifier stages; a differential electrical data input connected to the differential driver amplifier input of a first of said plurality of driver amplifier stages; and a plurality of DC bias elements, each DC bias element configured to individually control one of said plurality of driver amplifier stages.

Another aspect of the present disclosure relates to a distributed traveling wave modulator, comprising: a differential optical input for receiving an optical input carrier signal and a differential optical output for providing a modulated optical carrier signal; a plurality of optical phase-shifters connected in series as sequential modulators between said differential optical input and said differential optical output; a plurality of driver amplifier stages, each including a respective differential driver amplifier input, a differential driver amplifier output, and a differential signal output connected to a respective one of said sequential modulators; a plurality of delay/relay stages, each including a respective differential delay/relay input and a differential delay/relay output, each of said delay/relay stages connected between two driver amplifier stages; and a differential electrical data input connected to the differential driver amplifier input of a first of said plurality of driver amplifier stages; wherein each of the plurality of sequential optical phase shifters comprises a fixed optical length.

Another aspect of the present disclosure relates to a distributed traveling wave modulator, comprising: a differential optical input for receiving an optical input carrier signal and a differential optical output for providing a modulated optical carrier signal; a plurality of optical phase-shifters connected in series as sequential modulators between said differential optical input and said differential optical output; a plurality of driver amplifier stages, each including a respective differential driver amplifier input, a differential driver amplifier output, and a differential signal output connected to a respective one of said sequential modulators; a plurality of delay/relay stages, each including a respective differential delay/relay input and a differential delay/relay output, each of said delay/relay stages connected between two driver amplifier stages; and a differential electrical data input connected to the differential driver amplifier input of a first of said plurality of driver amplifier stages; wherein each of the driver amplifier stages includes a pre-amplifier stage.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 2B is a schematic circuit diagram of a driver amplifier stage of the distributed traveling-wave Mach-Zehnder modulator driver of FIG. 2A.

FIG. 2C is a schematic circuit diagram of a delay/relay stage of the distributed traveling-wave Mach-Zehnder modulator driver of FIG. 2A.

DETAILED DESCRIPTION

Figure 1A:
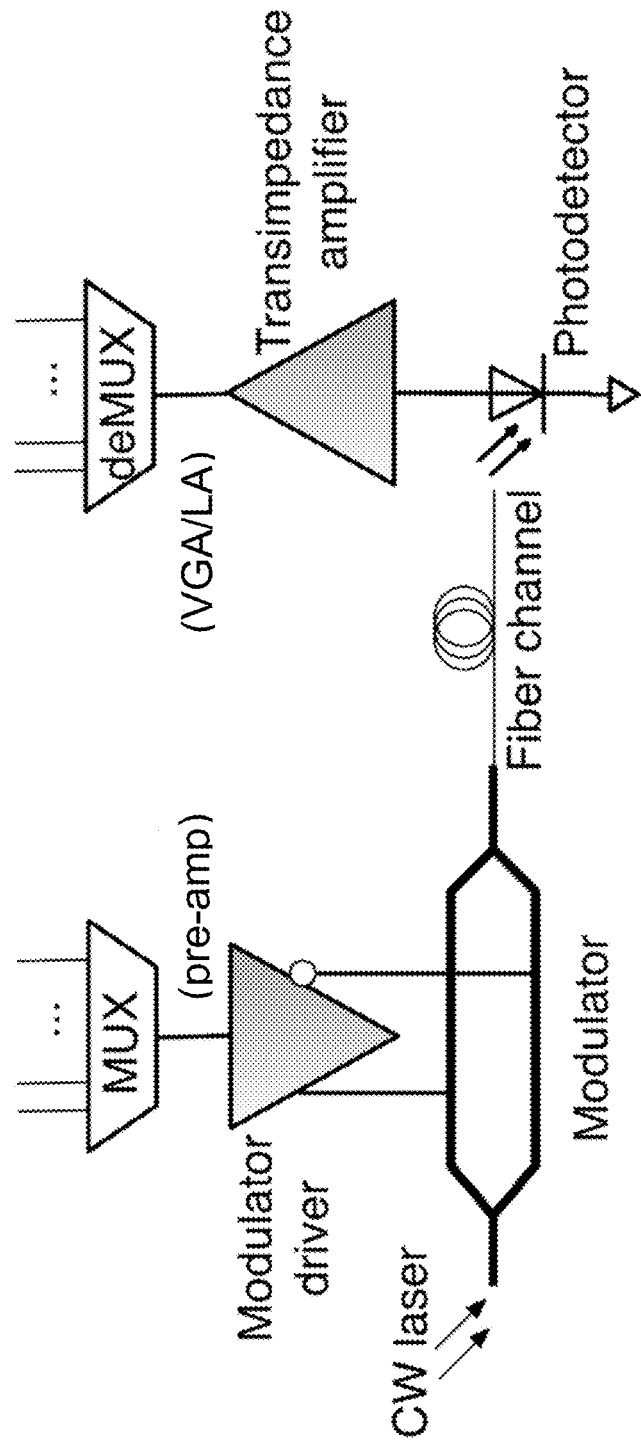
FIG. 1A is a block diagram of a typical optical transmitter and receiver of the prior art.

As illustrated in FIG. 1A, the analog front-end in a typical prior art optical transceiver includes a modulator driver and a transimpedance amplifier that serve as interfaces between a high-speed optical channel and lower speed digital electronics. Data is provided to the MUX and is modulated onto a laser carrier in an optical fiber using the driver and the modulator. The modulated carrier travels down the fiber. At a receiver, a photodetector samples the optical carrier and a transimpedance amplifier and DEMUX provide an electrical output signal that represents the data provided to the MUX.

Figure 1B:
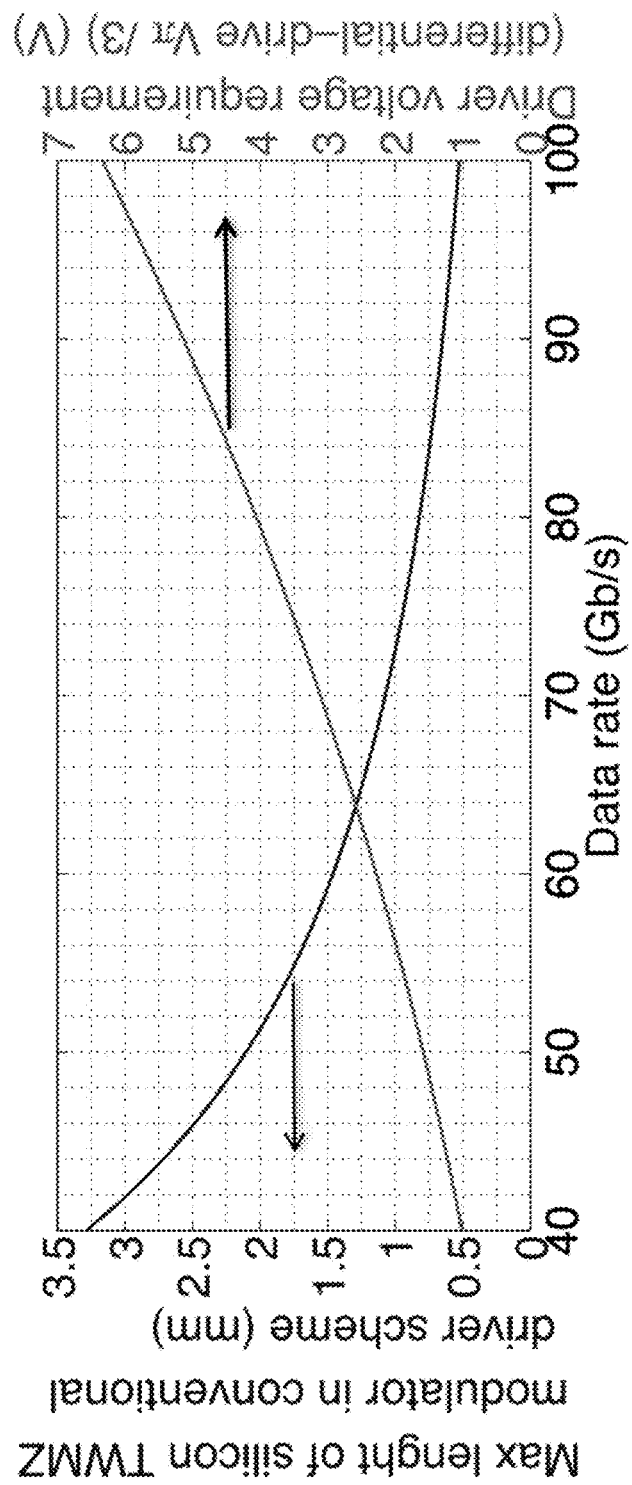
FIG. 1B is a graph that illustrates the power scaling versus data rate for prior art silicon traveling-wave modulators.

FIG. 1B shows the expected voltage requirement vs. data rate. As shown in FIG. 1B, the required drive voltage for the prior art modulator at 100 Gb/s is >6 Vpp (on each swing-end output), which is far from a practical voltage in existing CMOS/BiCMOS technology.

We describe systems and methods to provide ultra-high channel rate (40 to 100 Gb/s) optical transmitters in silicon-based electronics and photonics technology.

We have described another design of a traveling wave modulator in Ran Ding, Yang Liu, Qi Li, Yisu Yang, Yangjin Ma, Kishore Padmaraju, Andy Eu-Jin Lim, Guo-Qiang Lo, Keren Bergman, Tom Baehr-Jones, and Michael Hochberg, "Design and characterization of a 30-GHz bandwidth low-power silicon traveling-wave modulator," Optics Communications (available online Feb. 7, 2014).

In various embodiments of the present invention, the following assumptions are made: Cpn is 230 fF/mm, Rpn is 5.5 Ω-mm, Vπ Lπ is 2.0 V-cm, device bandwidth is 70% data rate, a differential-drive geometry is used, and an equivalent of Vπ/3 swing generate acceptable optical modulation amplitude. As an example, we describe a distributed TWMZ driver that can be fabricated in a 130-nm SiGe BiCMOS process in order to bridge the gap between the increasingly higher drive-voltage required by modulators and limited available driver output voltage swing from electronics at higher data rates.

Figure 2A:
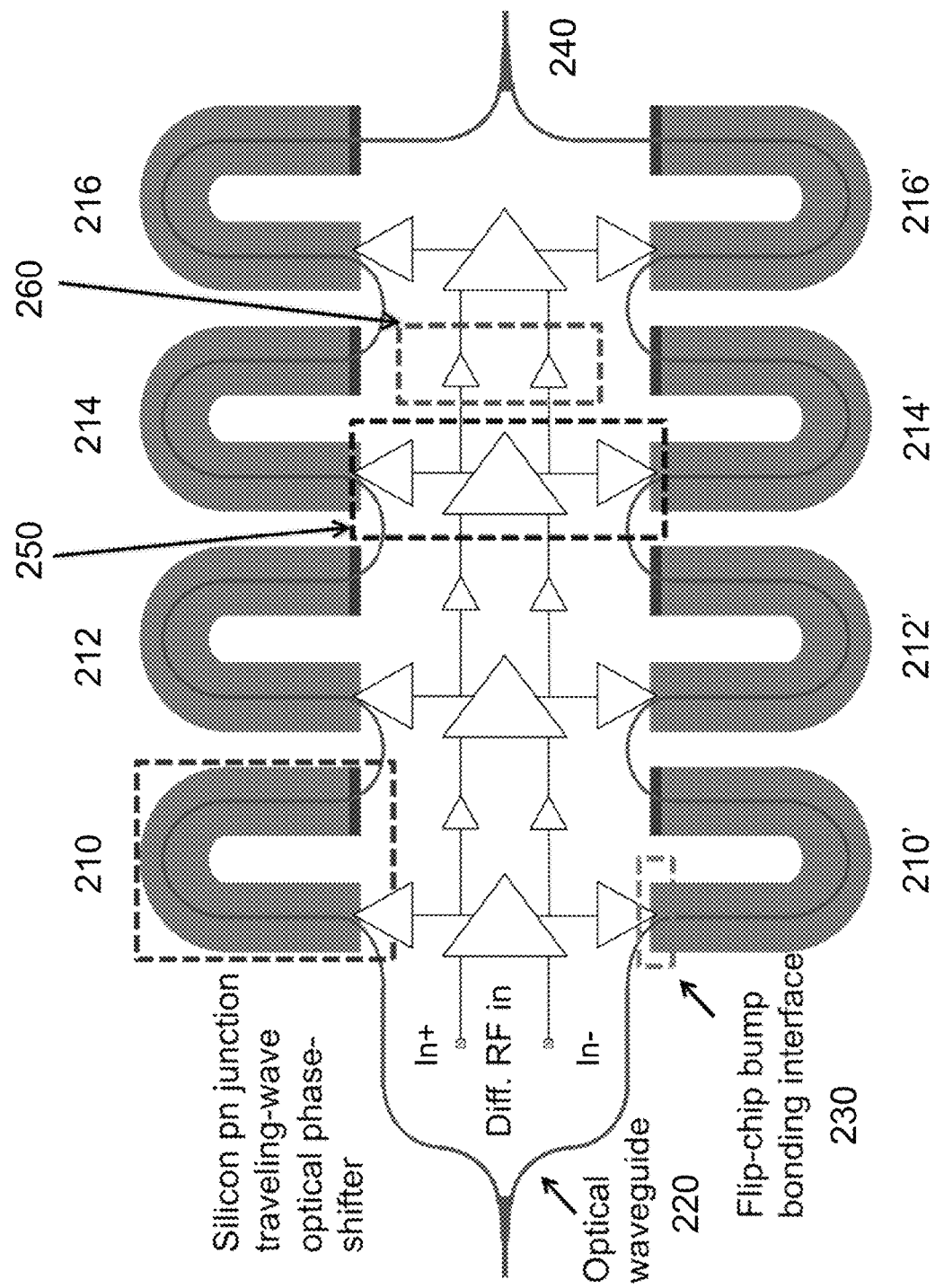
FIG. 2A is a circuit block diagram of a distributed traveling-wave Mach-Zehnder (TWMZ) modulator driver that operates according to principles of the invention.

FIG. 2A is a circuit block diagram of a distributed traveling-wave Mach-Zehnder (TWMZ) modulator driver that operates according to principles of the invention. An optical input waveguide 220 receives an optical signal that is to be modulated, and splits the signal in two, one portion of the signal passing through wave shifters 210, 212, 214 and 216, and the other portion of the signal passing through wave shifters 210', 212', 214' and 216'. In a preferred embodiment, the optical signal is split into two portions having equal intensities. In one embodiment, the wave shifter pairs (210, 210'), (212, 212'), (214, 214'), and (216, 216'), are Mach-Zehnder interferometers with fixed optical lengths to minimize power consumption and increase speed. The optical signals are recombined and exit the modulator at optical port 240. In some embodiments, the drive circuitry which will now be described is attached to the chip using flip-chip bump bonding, illustrated by bonding interface 230.

As shown in the circuit block diagram in FIG. 2A, the driver amplifier takes 400 mVpp input signals at each of the differential inputs In+ and In−, and delays and amplifies the signals to four pairs of differential outputs with 13 ps delay between each output stage. Each output swings 1 Vpp single-ended (2 Vpp differential) on a 25Ω impedance. The output is intentionally configured to be open-collector to offer the flexibility to drive both 25Ω and 50Ω impedance TWMZ sections (without and with near-end termination, respectively). The termination resistors are not illustrated in the schematic shown in FIG. 2B. They could be introduced during the packaging step or they could be monolithically integrated on the modulator side. The open-collector nature of the proposed driver enables the TWMZ sections to be designed to have different impedance, increasing the size of the optimization space and the number of possible configurations.

In the preferred embodiment of FIG. 2A, there are illustrated a plurality of N of optical phase shifter pairs, where N=4. In other embodiments, one can use a different number N of optical phase shifter pairs, so long as N is greater than or equal to 2. In the embodiment shown, the distributed traveling-wave Mach-Zehnder (TWMZ) modulator driver has four driver amplifier stages 250 (illustrated in greater detail in FIG. 2B) and three delay/relay stages 260 (illustrated in greater detail in FIG. 2C).

In other embodiments, one can use other kinds of optical phase shifters in place of the TWMZ, so long as the number of optical phase shifters is greater than or equal to 2.

FIG. 2B and FIG. 2C are circuit diagrams that illustrate preferred embodiments of the driver amplifier stages 250 and the delay/relay stages 260 of FIG. 2A, respectively. The driver stage 250, shown in FIG. 2B, starts with a pair of emitter followers 252a and 252b equipped with termination resistors for efficient coupling to the data source or to the previous stage of the driver. The received signal is then amplified using a differential pair 254a and 254b, and subsequently buffered again using emitter followers 256a and 256b. Finally, the signal is split and applied to two open collector cascode output drivers 258a and 258b, one driving the TWMZ segment, and one 259a and 259b amplifying the signal for the following stage of the driver. Each modulator includes a driver amplifier stage 250, which includes only a single type of transistor to enable high-speed operation. The preferred type is NPN bipolar transistor; however other possible transistors include a PNP, a MOSFET (NFET or PFET, either one) or even a HEMT or a pHEMT.

In one embodiment, the integration interface between silicon TWMZ sections and the driver circuits is expected to be flip-chip bump-bonding. A 40 fF parasitic capacitance is assumed for each signal connection. The optical delay of each TWMZ section plus optical waveguide wiring matches the delay between the amplifier stages so that the modulations constructively add. As an additional step to improve the performance, we have incorporated pre-amplification in the driver output to extend the length of TWMZ sections that can be driven at 100 Gb/s by about 40%. The driver pre-amplifier stage 254a and 254b is shown in FIG. 2B immediately after the input emitter follower stage 252a and 252b. Without the pre-amplifier 254a and 254b the overall driver 250 would not be able to have the gain-bandwidth product required to achieve the target 100 Gb/s data rate, especially when driving a longer TWMZ section.

The example circuit described above consumes 1.5 W power overall. The DC bias structures illustrated on the right of the chip (FIG. 2D) control the on and off states of each main driver stage individually, which is a useful feature for testing before integration. The bias voltages Vtb and Vtb_main of the driver section 250 shown in FIG. 2B are generated separately in the DC Bias structures shown in FIG. 2D. Each of the driver sections 250 can then be enabled or disabled by turning the corresponding bias voltages on and off. This increases the flexibility of the driver 250, allowing integration with different types of TWMZs. For example, if the TWMZ has only three sections, the fourth section of the driver (the one providing outputs Out4+ and Out4− in FIG. 2D) can be shut down, reducing the overall power dissipation. The feature can also be useful in other scenarios. For example, if optical modulation resulting from the action of fewer stages of the driver is found to be adequate, the redundant stages can be shut down. In addition, slight variation in the biasing voltages of individual stages can be used to optimize delays, gains and the overall performance of the driver-TWMZ system.

Figure 2D:
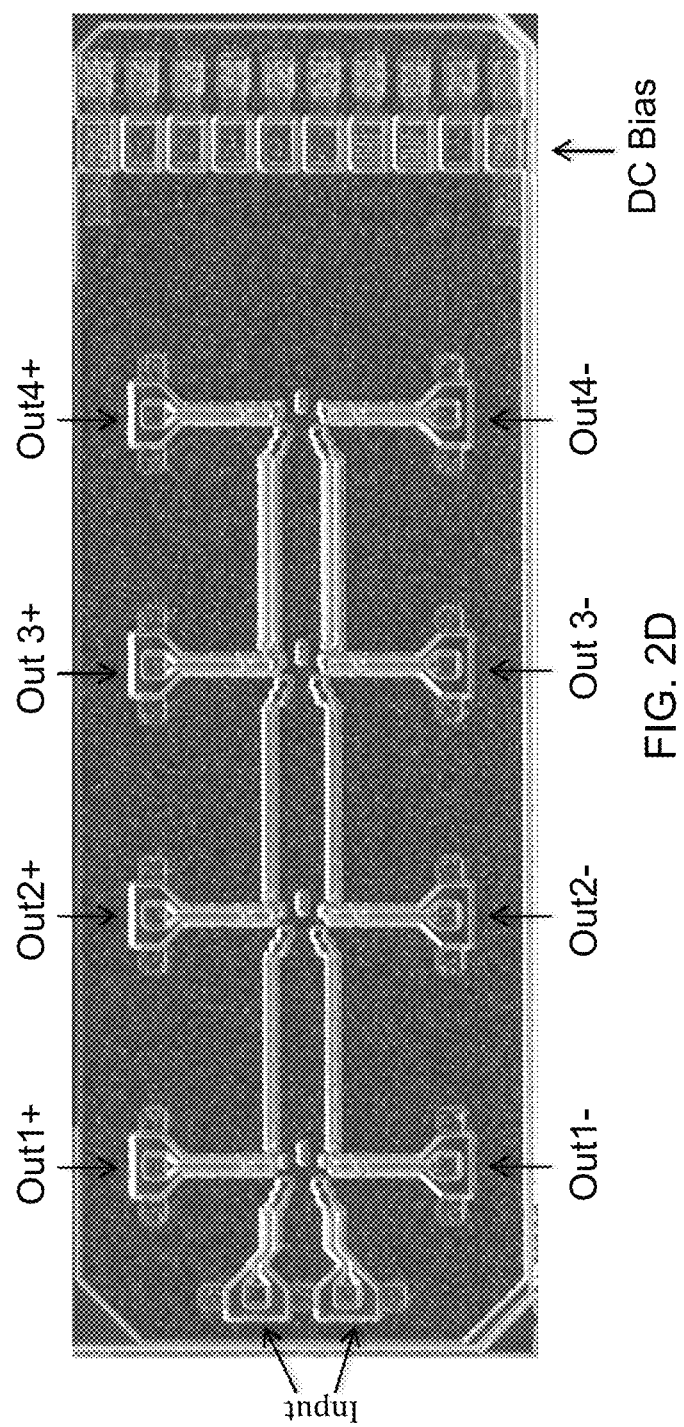
FIG. 2D is an image of a chip that embodies the distributed traveling-wave Mach-Zehnder modulator driver of FIG. 2A. The chip has a width of 1 mm and a length of 2.9 mm. DC bias is provided by the structure at the right side of the chip.

In the embodiment shown in FIG. 2D the chip or substrate is silicon. In other embodiments, the substrate can be fabricated from a semiconductor, which may be different from a silicon or silicon-on-insulator wafer.

Figures 3A, 3B:
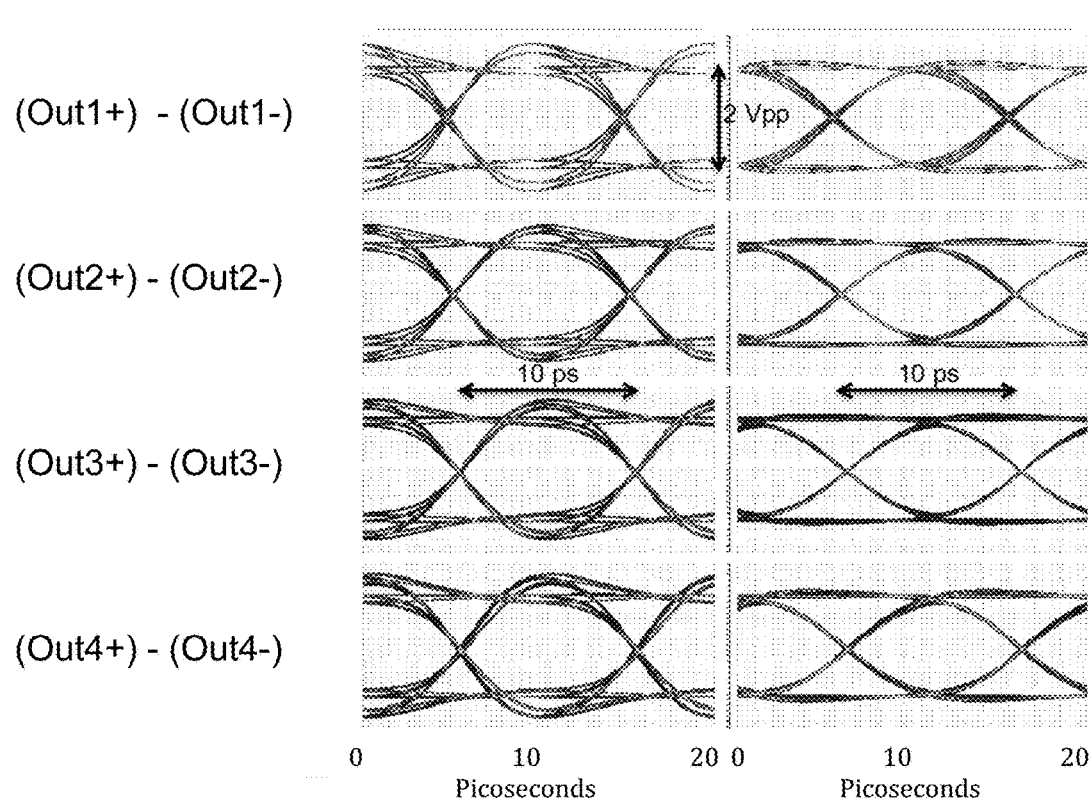
FIG. 3A is a graph that illustrates the results of a distributed TWMZ driver post-layout simulation showing 100 Gb/s eye-diagrams at the driver outputs.
FIG. 3B is a graph that illustrates the results of a distributed TWMZ driver post-layout simulation showing 100 Gb/s eye-diagrams after the Si TWMZ. The differential output is 2 Vpp at 25Ω impedance; data is shifted by 13 picoseconds (ps) between each output stage.

Post-layout simulations at 100 Gb/s is shown in FIG. 3A and FIG. 3B. The TWMZ sections are modeled using an equivalent circuit model. Bump-bonding parasitics are taken into account. As one can see, similar electrical eye quality is maintained in each stage output and this is achieved by scaling the transmission lines and device sizes in each stage. The eye-diagrams at the end of the TWMZ (FIG. 3B) provide a conservative estimation of the optical eye-diagrams.

In the driving scheme used in the embodiment of FIG. 2A through FIG. 2D, the overall drive voltage requirement is linearly lowered by accumulating modulation from four sections of TWMZ of 750 μm length, achieving an overall modulator length of 3 mm, which is similar to a 40 Gb/s device illustrated in FIG. 1B. The present device provides a practical solution for a 100 Gb/s optical transmitter.

In operation, an optical wave (or an optical signal) to be modulated is expected to be received at an input port such as 220, subjected to a succession of N modulations performed by successive ones of a plurality N a plurality N of optical phase-shifters connected in series connection as N sequential modulators, where N is greater than or equal to 2, each of the N−1 phase shifts after the first of the N phase shifts delayed by a time calculated to apply each of the N−1 phase shifts after the first of the N phase shifts at a respective time when the optical signal passes a respective one of the N−1 sequential modulators after the first modulator, and providing a modulated optical signal at an optical output port, such as port 240.

The apparatus described above can be used for performing such optical modulation as just described.

DEFINITIONS

Unless otherwise explicitly recited herein, any reference to an electronic signal or an electromagnetic signal (or their equivalents) is to be understood as referring to a non-volatile electronic signal or a non-volatile electromagnetic signal.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A distributed traveling wave modulator, comprising:
    a differential optical input for receiving an optical input carrier signal and a differential optical output for providing a modulated optical carrier signal;
    a plurality of optical phase-shifters connected in series as sequential modulators between said differential optical input and said differential optical output;
    a plurality of driver amplifier stages, each including a respective differential driver amplifier input, a differential driver amplifier output, and a differential signal output connected to a respective one of said sequential modulators;
    a plurality of delay/relay stages, each including a respective differential delay/relay input and a differential delay/relay output, each of said delay/relay stages connected between two driver amplifier stages;
    a differential electrical data input connected to the differential driver amplifier input of a first of said plurality of driver amplifier stages; and
    a plurality of DC bias elements, each DC bias element configured to individually control one of said plurality of driver amplifier stages;
    wherein each DC bias element is capable of controlling an on state and an off state of a respective driver amplifier stage for shutting down redundant driver amplifier stages.

2. The modulator according to claim 1, wherein each driver amplifier stage includes only a single type of transistor to enable high-speed operation.

3. The modulator according to claim 1, wherein each of the plurality of sequential optical phase shifters comprises a fixed optical length.

4. The modulator according to claim 1, wherein each of the driver amplifier stages includes a pre-amplifier stage.

5. The modulator according to claim 1, wherein each output of each driver amplifier stage is configured to be open-collector for driving both 25Ω and 50Ω impedance modulators.

6. The modulator according to claim 1, wherein the plurality of optical phase shifters comprises four sequential Mach-Zehnder modulator pairs.

7. A distributed traveling wave modulator, comprising:
    a differential optical input for receiving an optical input carrier signal and a differential optical output for providing a modulated optical carrier signal;
    a plurality of optical phase-shifters connected in series as sequential modulators between said differential optical input and said differential optical output;

a plurality of driver amplifier stages, each including a respective differential driver amplifier input, a differential driver amplifier output, and a differential signal output connected to a respective one of said sequential modulators;

a plurality of delay/relay stages, each including a respective differential delay/relay input and a differential delay/relay output, each of said delay/relay stages connected between two driver amplifier stages; and a differential electrical data input connected to the differential driver amplifier input of a first of said plurality of driver amplifier stages;

wherein each of the plurality of sequential optical phase shifters comprises a fixed optical length; and wherein each driver amplifier stage includes only a single type of transistor to enable high-speed operation.

8. The modulator according to claim 7, further comprising a plurality of DC bias elements, wherein each DC bias element capable of controlling an on state and an off state of a respective driver amplifier stage for shutting down redundant driver amplifier stages.

9. The modulator according to claim 7, wherein each of the driver amplifier stages includes a pre-amplifier stage.

10. The modulator according to claim 7, wherein each output of each driver amplifier stage is configured to be open-collector for driving both 25Ω and 50Ω impedance modulators.

11. The modulator according to claim 7, wherein said plurality of sequential modulators comprise four sequential Mach-Zehnder modulator pairs.

12. A distributed traveling wave modulator, comprising:
a differential optical input for receiving an optical input carrier signal and a differential optical output for providing a modulated optical carrier signal;

a plurality of optical phase-shifters connected in series as sequential modulators between said differential optical input and said differential optical output;

a plurality of driver amplifier stages, each including a respective differential driver amplifier input, a differential driver amplifier output, and a differential signal output connected to a respective one of said sequential modulators;

a plurality of delay/relay stages, each including a respective differential delay/relay input and a differential delay/relay output, each of said delay/relay stages connected between two driver amplifier stages; and a differential electrical data input connected to the differential driver amplifier input of a first of said plurality of driver amplifier stages;

wherein each of the driver amplifier stages includes a pre-amplifier stage; and wherein each output of each driver amplifier stage is configured to be open-collector for driving both 25Ω and 50Ω impedance modulators.

13. The modulator according to claim 12, further comprising a plurality of DC bias elements, wherein each DC bias element capable of controlling an on state and an off state of a respective driver amplifier stage for shutting down redundant driver amplifier stages.

14. The modulator according to claim 12, wherein each driver amplifier stage includes only a single type of transistor to enable high-speed operation.

15. The modulator according to claim 12, wherein said plurality of sequential modulators comprise four sequential Mach-Zehnder modulator pairs.

* * * * *